US011074200B2

United States Patent
Branco et al.

(10) Patent No.: US 11,074,200 B2
(45) Date of Patent: Jul. 27, 2021

(54) USE-AFTER-FREE EXPLOIT PREVENTION ARCHITECTURE

(71) Applicant: Intel Corporation, Santa Clara, CA (US)

(72) Inventors: Rodrigo R. Branco, Hillsboro, OR (US); Kekai Hu, Portland, OR (US); Ke Sun, Portland, OR (US)

(73) Assignee: Intel Corporation, California (CA)

( * ) Notice: Subject to any disclaimer, the term of this patent is extended or adjusted under 35 U.S.C. 154(b) by 205 days.

(21) Appl. No.: 15/843,878

(22) Filed: Dec. 15, 2017

(65) Prior Publication Data

US 2019/0042472 A1   Feb. 7, 2019

(51) Int. Cl.
*G06F 12/14*   (2006.01)
*G06F 12/02*   (2006.01)
*G06F 21/79*   (2013.01)

(52) U.S. Cl.
CPC .......... *G06F 12/145* (2013.01); *G06F 12/023* (2013.01); *G06F 12/14* (2013.01); *G06F 21/79* (2013.01); *G06F 2221/2135* (2013.01)

(58) Field of Classification Search
CPC ............................ G06F 12/145; G06F 12/023
See application file for complete search history.

(56) References Cited

U.S. PATENT DOCUMENTS

| 4,912,629 | A  | * | 3/1990  | Shuler, Jr. ........... G06F 12/0261 |
| 7,039,774 | B1 | * | 5/2006  | Cruz-Rios ............. G06F 12/023 |
|           |    |   |         | 709/226 |
| 2013/0132699 | A1 | * | 5/2013  | Vaishampayan ...... G06F 11/073 |
|           |    |   |         | 711/170 |
| 2017/0262387 | A1 | * | 9/2017  | Sell ...................... G06F 9/45558 |
| 2017/0344468 | A1 | * | 11/2017 | Kirshenbaum ....... G06F 12/023 |
| 2019/0079874 | A1 | * | 3/2019  | Garc A Guirado ......................... G06F 12/0891 |

* cited by examiner

*Primary Examiner* — Michelle T Bechtold
(74) *Attorney, Agent, or Firm* — Schwegman Lundberg & Woessner, P.A.

(57) ABSTRACT

Various systems and methods for memory management are described herein. A system for managing memory includes a memory management unit to: receive an indication of a memory allocation request; identify a memory region to satisfy the memory allocation request; determine whether the memory region has a tracking record in a tracking data structure, the tracking data structure configured to track whether a particular memory region has any references pointing to it; and revise the tracking record in the tracking data structure when the memory region has the tracking record.

20 Claims, 6 Drawing Sheets

PROCESS 1 CODE

```
char* p1 = (char*) malloc (SIZE);
char* p2 = p1;
free(p1);
p1 = NULL;

myFunction (p2);
```

PROCESS 2 CODE

```
char* p3 = (char*) malloc (SIZE);
strcpy(p3, "changed contents");
```

USE-AFTER-FREE EXPLOIT PREVENTION ARCHITECTURE

TECHNICAL FIELD

Embodiments described herein generally relate to memory management and in particular, to an exploit prevention architecture.

BACKGROUND

A Use-After-Free (UAF) vulnerability is a class of memory corruption bugs that has been extensively used to exploit computer systems. A UAF error occurs when a program is able to use a pointer to reference memory that has been freed. The use of previously freed memory may have any number of adverse consequences ranging from the corruption of valid data to the execution of arbitrary code, depending on the instantiation and timing of the flaw.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Use-after-free (UAF) issues may occur in various scenarios. The simplest way data corruption may occur involves the system's reuse of freed memory. For instance, a program may initially request a memory allocation from the system and create a pointer to reference the allocated memory. A free( ) operation is used to deallocate the memory. However, a free( ) operation does not wipe the memory or clear the pointer. As such, another portion of the program or a whole different program may request a memory allocation using a different pointer and be provided the same memory space. The other pointer may be used to modify the memory space. Later, when the original pointer is reused, the memory it references is altered. The changed memory may cause a program malfunction.

Existing UAF prevention techniques are typically at the software level and apply one of two methods: (1) preventing coding errors that may lead to UAF and (2) preventing the exploitability at run time.

The first method may be performed statically (e.g., at compile time) or dynamically (e.g., at runtime). For instance, a compiler may be used to flag when pointers are not set to NULL after a free( ) operation was used on memory that the pointer was referencing. The second method may be performed using heap analysis on each memory allocation request, for example. Each of these types of methods have drawbacks.

An improvement to UAF prevention provides faster program execution time and more security is described herein. This improves the operation of the computing device. Compared to existing software implementations, which may have a high miss rate or hefty performance overhead, the architecture described herein provides fast, lightweight, and comprehensive technology to reduce UAF exploits. Additionally, the improved implementation described herein may be implemented in software or hardware, depending on the system design, resulting in a good balance between high performance and low implementation complexity.

Figure 1:
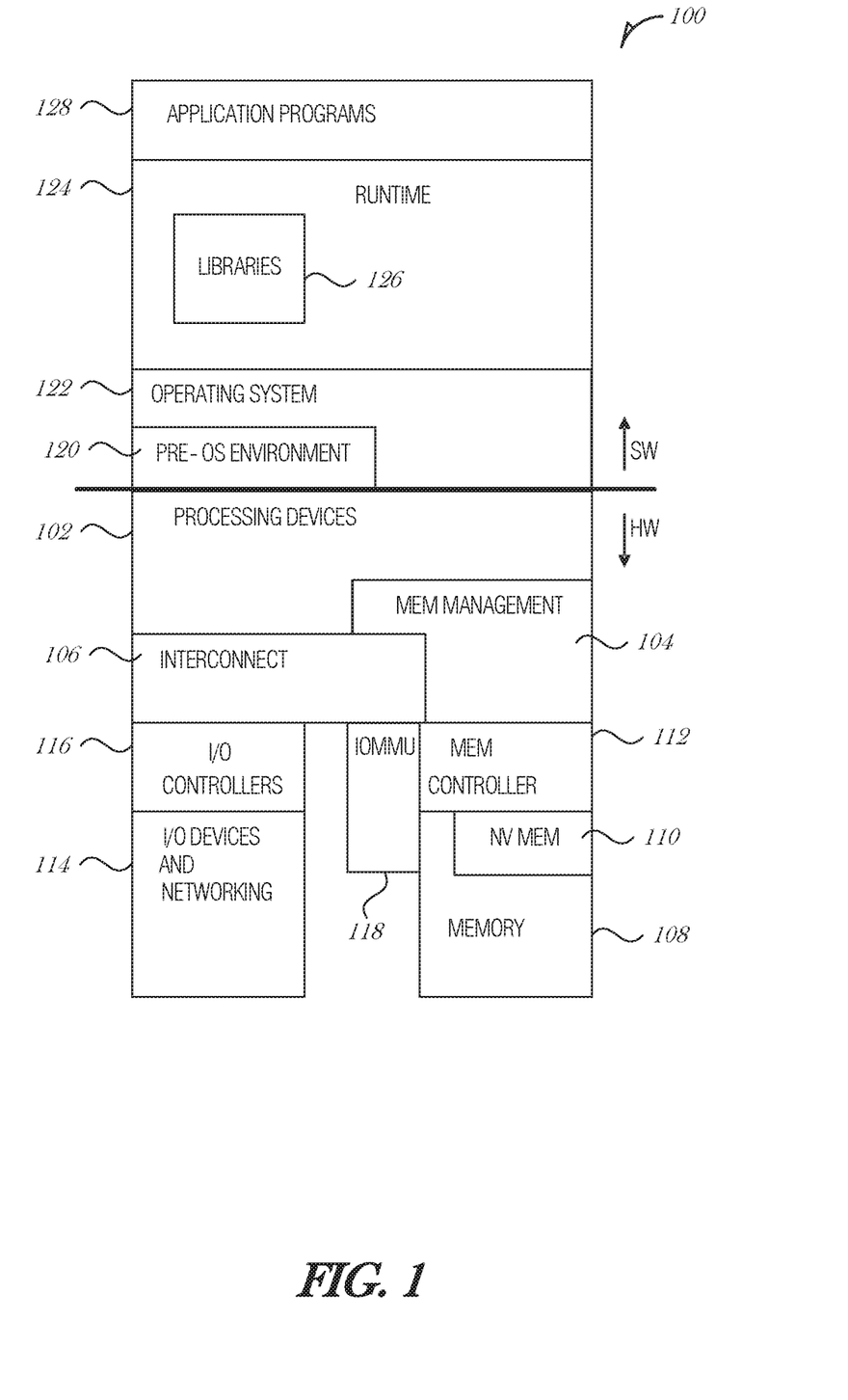
FIG. 1 is a diagram illustrating a hardware and software architecture of a computer system, in which various interfaces between hardware components and software components are shown, according to an embodiment.

FIG. 1 is a diagram illustrating a hardware and software architecture microarchitecture 100 of a computing device, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices. e.g., PCI, USB, etc. Memory 108 (e.g., dynamic random access memory—DRAM) and non-volatile memory 110 such as flash memory (e.g., electrically-erasable read-only memory—EEPROM, NAND Flash. NOR Flash, etc.) are interfaced with memory management device 104 and interconnect 106 via memory controller 112. This architecture microarchitecture 100 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by mediating access to memory 108 from I/O device 114. IOMMU 118 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basis operability of the computing device itself.

Figure 2:
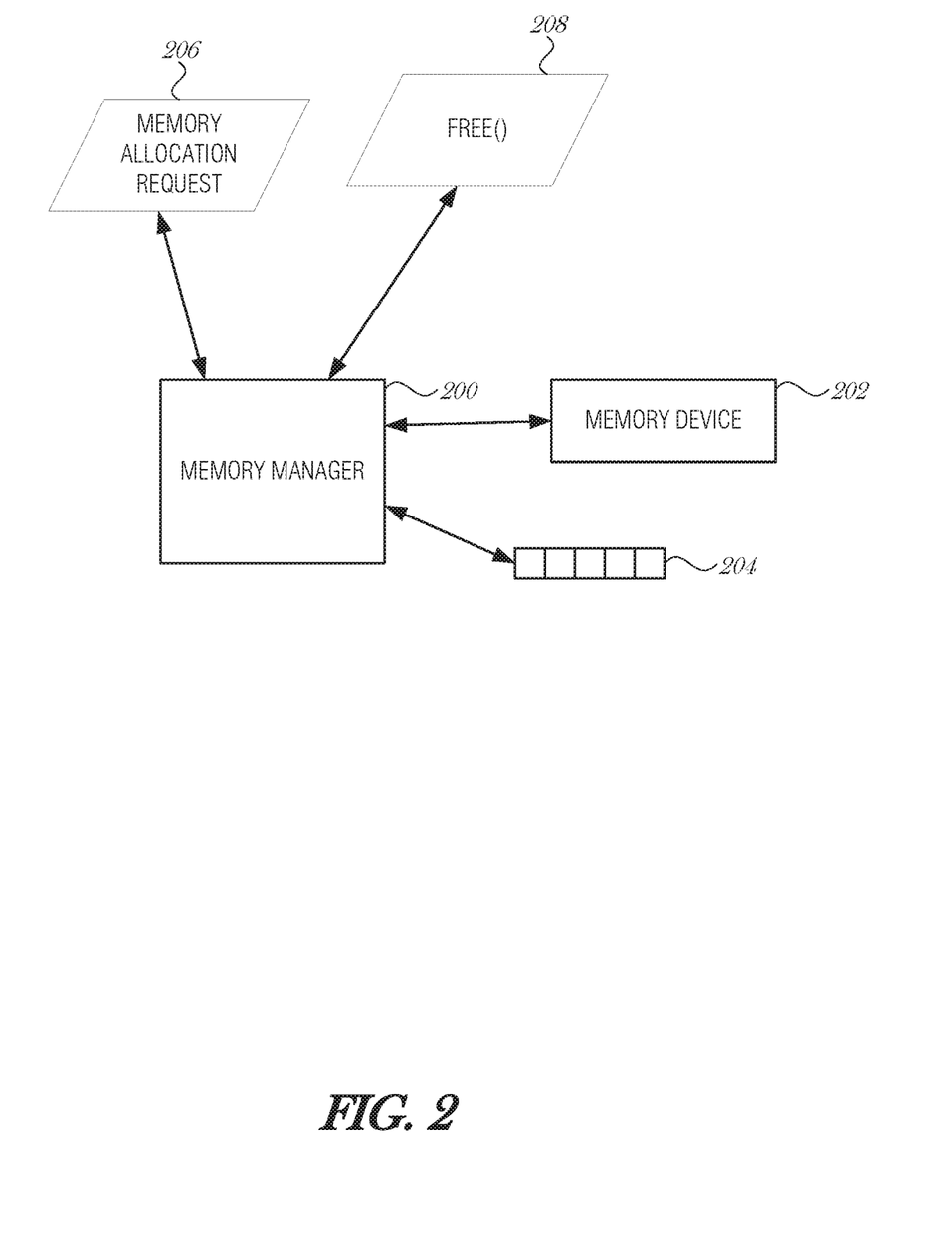
FIG. 2 is a block diagram illustrating control and data flow, according to an embodiment.

FIG. 2 is a block diagram illustrating control and data flow, according to an embodiment. A memory manager 200 is configured to manage the allocation of memory blocks. It maintains lists of active and free memory for a memory device 202. The memory device 202 may be DRAM, SRAM, or any other type of addressable memory.

The memory manager 200 may operate in software or hardware. For instance, the memory manager 200 may operate as part of an operating system library, a runtime platform, or a device driver. Alternatively, the memory manager 200 may be implemented in hardware, for instance as part of the memory management device 104 or memory controller 112.

The memory manager 200 maintains a dedicated tracking data structure 204 associated with the allocated memory blocks. The tracking data structure 204 is used to mark memory blocks that have pointers referencing them. The tracking data structure 204 may be conceptually understood as a table with each row (e.g., tracking record) including the tuple {memory region, available flag}.

The memory region is used to identify the block of memory that was allocated. The memory region may be an address location stored as an address with an offset, an address with a size (e.g., size in bytes), a beginning and ending address, or the like.

The available flag is used to indicate whether the corresponding memory region is available for reuse in a memory allocation operation. The available flag may include a count of the number of pointers that are referencing the memory region. If the count of pointers is greater than zero, then the memory blocks in the memory region are still effectively in use and is not available for reallocation. When the count of pointers is zero, that indicates that there are no more stale pointers, and the memory blocks in the memory region may be reallocated and assigned to a new pointer for its use.

The available flag may also be implemented as a tuple (count of pointers, valid bit). In this case, the valid bit is set to one when the count of pointers is greater than zero. The valid bit indicates whether the memory region is a valid allocation. Consistent with this, the memory is not available for reallocation when the count of pointers is greater than zero. Conversely, the memory is available for reallocation when the count of pointers is zero. In this state, the valid bit would be set to zero. Using a single-bit valid bit is advantageous to reduce the cost of checking (e.g., a 1-bit check). However, use of the valid bit comes at some increased cost to maintain it when setting the count of pointers value. As such, the use of the valid bit depends on design considerations.

When a memory allocation request 206 is received at the memory manager 200, the memory manager 200 identifies a block of memory to allocate to satisfy the request 206. The block of memory may have been used previously by a process, which then freed it. However, if the process did not clean up correctly, then it may still have pointers to the block of memory, which may later attempt to address the memory and use its contents. Thus, the memory manager 200 checks the tracking data structure 204 to determine whether the block of memory is actually available.

If the block of memory is not found in the tracking data structure 204, then a new tracking record is inserted into the tracking data structure 204 with the tuple {memory region=block of memory, available flag=FALSE}. It is understood that the available flag may be set to logical FALSE using a count of pointers value (e.g., one for the first pointer in an initial allocation), or with a valid bit (e.g., set to one as valid allocation). Other implementations are considered to be included in the scope of this discussion.

If the block of memory is found in a tracking record in the tracking data structure 204, then the tracking record is checked whether the available flag indicates that the memory is available for reallocation. For instance, if the available flag uses solely a count of pointers value, and the number is zero, then the available flag is a logical TRUE and indicates that the memory is available for reallocation (e.g., no pointers are pointing to the memory). The memory manager 200 may change the available flag to indicate that the memory is no longer available for reallocation, and return the address to the requesting process. Changing the available flag may include: 1) increasing the number of pointers from zero to one, and optionally 2) changing the valid bit from zero to one, when the valid bit is included in the implementation.

When a free( ) operation 208 is received at the memory manager 200, the memory manager 200 reduces the count of pointers value by one. If the count of pointers value becomes zero as a result of this operation, and the valid bit is being used, then the valid bit is set to zero. In this case, the memory is actually "freed" and may be re-used in the future. Optionally, the freed pointer may be set to NULL so that the process is not able to accidentally reference the memory again with the pointer.

This architecture may be implemented either in hardware with finite state machines that have very low performance impact or in software that is more flexible and easier to implement. For example, if implemented by hardware, the proposed data structures may be put in a table inside a dedicated local memory resource such as register banks, on-chip SRAM, or an isolated DRAM region, depending on the resource availability and performance demand. It uses minimal resource overhead, for instance, 1 bit valid+32 bits counter+32 bits memory address+32 bits offset=97 bits per memory region. It is understood that other data structures may be used. For instance, in a 64-bit memory space, 64 bits may be used to for the address and the offset. As another instance, the valid bit may be omitted from the data structure. As yet another instance, the number of bits used for the pointer counter may be reduced or increased, depending on the number of expected pointers in use.

The memory management logic may be carried out by software (OS) as current heap implementation, while the logic to (1) update these data structures. (2) search and match a to-be-allocated memory region within the table, and (3) determine if the allocation is allowed may be implemented as hardware logic and remain transparent to software. Besides the fact that hardware implementation is much faster than the current software mitigation, the software implementation is also much faster than existing software solutions since only one single valid bit or a simple counter check needs to be checked at allocation time rather than checking the whole stack, heap, and registers at every free operation.

Figure 3:
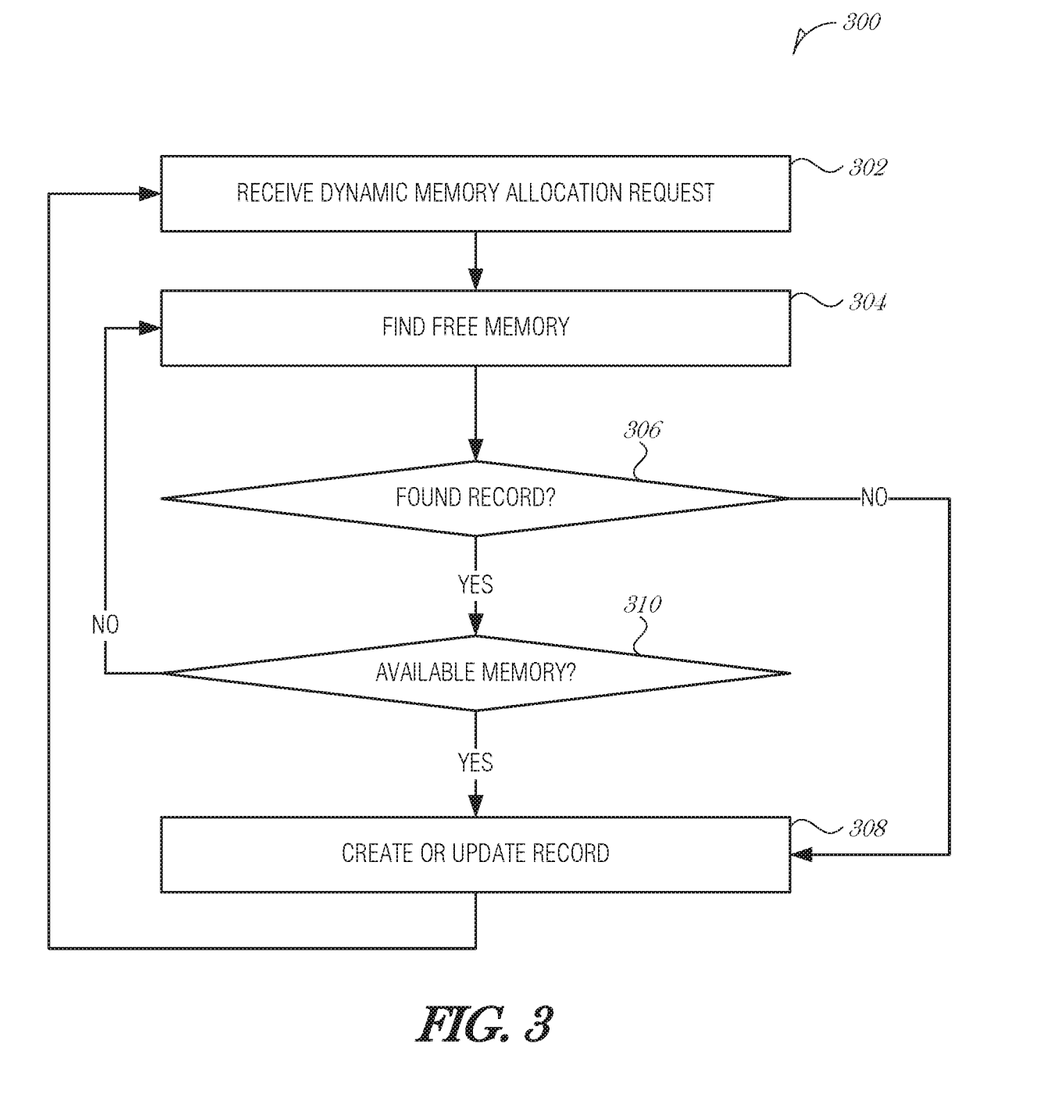
FIG. 3 is a flowchart illustrating a method for dynamic memory management, according to an embodiment.

FIG. 3 is a flowchart illustrating a method 300 for dynamic memory management, according to an embodiment. At 302, a dynamic memory allocation request is received at a memory manager. The memory manager finds a free memory area with the requested size (operation 304). The memory manager references a tracking data structure to determine if the free memory area has a tracking record in the tracking data structure (decision operation 306). If there is no tracking record, then the memory manager creates one and stores the availability of the memory in the tracking record (operation 308). The availability may be stored as a valid bit along with a count of pointers, as a count of pointers, or using other types of flags.

If instead the free memory area does have a tracking record in the tracking data structure, then the memory manager determines if the memory is actually available (decision operation 310). If the memory is actually available, then the memory manager may update the tracking record with the availability of the memory (e.g., changing a valid bit) (operation 308). If the memory is not actually available, then the memory manager proceeds back to operation 304 to find another free memory area that satisfies the memory allocation request.

If a memory area does not pass the check at decision operation 310, even though it is an already freed memory, the method 300 will treat it as occupied allocated memory and prevent it from being allocated and modifiable with new values.

After a memory location is dynamically allocated, every time there is a new pointer referencing it, the pointer counter is increased by one, while every time the program frees a pointer referencing this memory location, it sets the freed pointer to NULL and decreases the counter by one. When using a valid bit, if and only if the pointer counter value is zero, which means there are no more pointers referencing this memory location, is the valid bit set to zero. In this case, this memory is actually "freed" and may be re-used by other processes.

The method 300 and data and control flow 200 from above control the availability of a dynamic memory based on tracking all the references to memory, to prevent any intermediate modifications of this memory region before all the pointers associated with it are completely freed. Since the attackers lose the ability to control the freed memory before it is reused, they lose the exploitability of UAF vulnerabilities.

Figure 4:
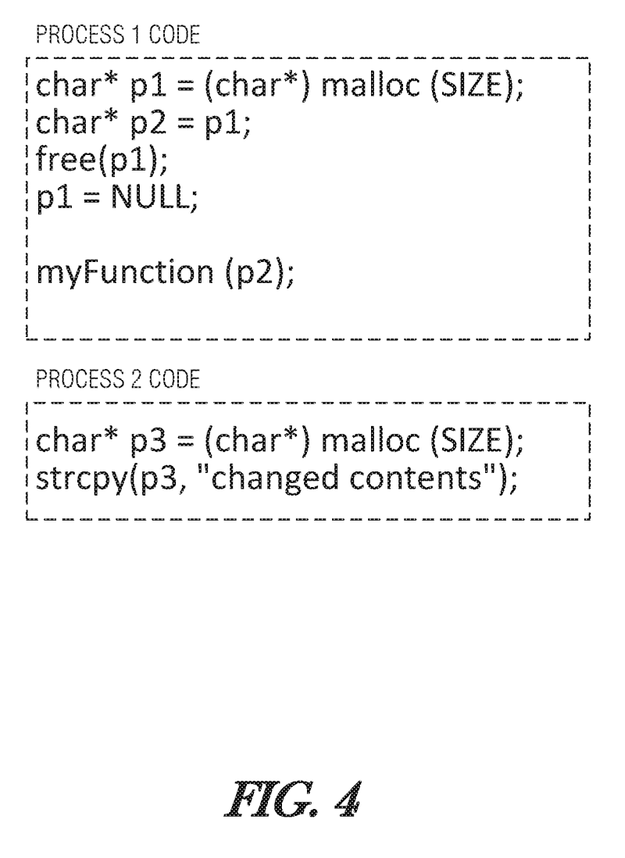
FIG. 4 illustrates example code, according to an embodiment.

FIG. 4 illustrates example code, according to an embodiment. In FIG. 4, the PROCESS 1 code is used to allocate a memory region equal to SIZE and store the memory address to the region in pointer p1. Another character pointer p2 is declared and assigned the value of p1. The free( ) operation is used to free the memory that p1 points to, and then p1 is set to NULL. However, pointer p2 still has the memory address of the now "free" memory region.

Without the implementations described here, an attacker may allocate a region of the same size and assign it to a character pointer p3 as illustrated in the PROCESS 2 code right after the free (p1) operation but before the function call using p2. By chance or design, the p3 pointer is provided the same region that p1 and p2 were using because it is free and of the same size (e.g., SIZE) and type (e.g., char*). As such, PROCESS 2 may use the p3 pointer to change the contents of the memory region. At a later time, the PROCESS 1 code attempts to use the p2 pointer and instead of referencing the value that PROCESS 1 expected to find there, it instead references the contents that PROCESS 2 stored.

Using the implementations described in this document prevent such an attack. When the memory allocation p1= (char*) malloc (SIZE) happens, a valid bit of one and pointer counter value of one are assigned to the memory area pointed to by p1. When the code char*p2=p1 executes, the pointer counter becomes two, and when free (p1) happens, the counter decreases to one. At this point, since the counter value is still larger than zero, the valid bit will still be one. If an attacker tries to malloc another pointer p3 with the same SIZE, since the valid bit is still one, the memory manager mechanism will not allow it to point to the same location as p1 originally points, but instead give p3 another location, thus the attacker cannot modify the p1 memory area before p2 is freed and set to NULL. In this scenario, even if p2 is used in a later time, it will still point to the original data as expected.

Figure 5:
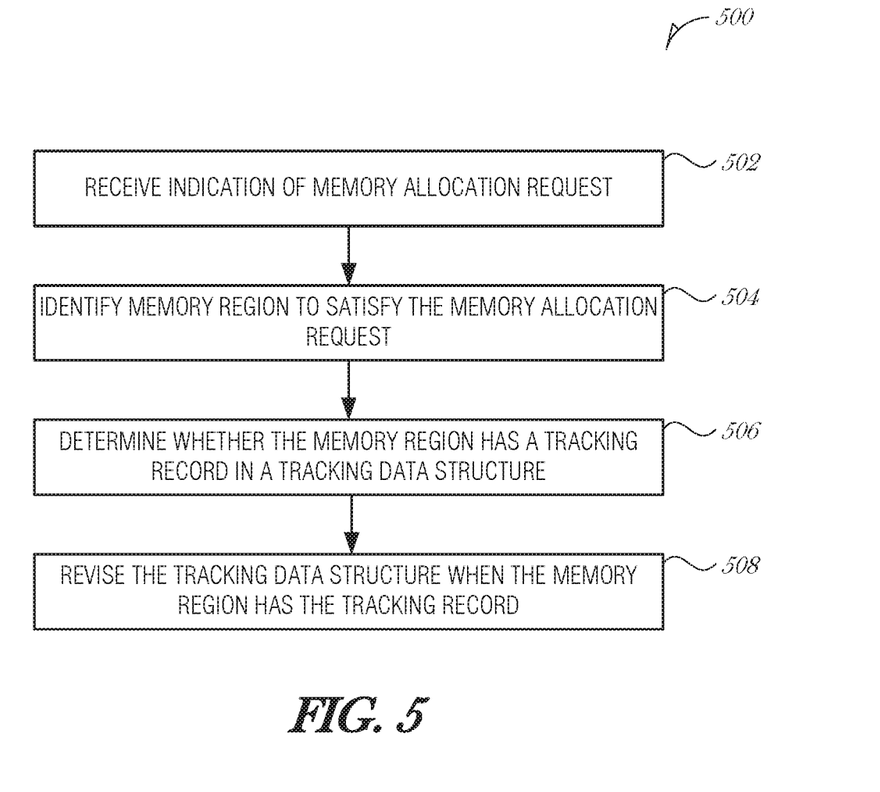
FIG. 5 is a flowchart illustrating a method of managing memory, according to an embodiment.

FIG. 5 is a flowchart illustrating a method 500 of managing memory, according to an embodiment. At operation 502, an indication of a memory allocation request is received. At 504, a memory region to satisfy the memory allocation request is identified. The memory region may be identified based on the size of memory requested in the memory allocation request. At 506, it is determined whether the memory region has a tracking record in a tracking data structure, the tracking data structure configured to track whether a particular memory region has any references pointing to it.

At 508, the tracking record in the tracking data structure is revised when the memory region has the tracking record.

In an embodiment, revising the tracking record includes incrementing a pointer counter. In a further embodiment, revising the tracking record also includes setting a valid bit to indicate that the memory region is validly allocated. In a further embodiment, setting the valid bit to indicate that the memory region is validly allocated comprises setting the valid bit to one.

In an embodiment, the method 500 includes creating a new tracking record in the tracking data structure when the memory region does not have a corresponding tracking record. In a further embodiment, creating the new tracking record includes setting a pointer counter to one. In a further embodiment, creating the new tracking record includes setting a valid bit to indicate that the memory region is validly allocated. In a further embodiment, setting the valid bit to indicate that the memory region is validly allocated includes setting the valid bit to one.

In an embodiment, the method 500 includes receiving an operation to free the memory region, decrementing the pointer counter, and setting the valid bit to indicate that the memory region is not validly allocated. For instance, the operation to free the memory region may be a free( ) operation. In a further embodiment, setting the valid bit to indicate that the memory region is validly allocated includes setting the valid bit to zero.

In an embodiment, the method 500 includes receiving an indication that a new reference to the memory region has been created and incrementing the pointer counter in the tracking record for the memory region. For instance, when a pointer is copied to another pointer, then the tracking record may be updated to increment the pointer counter to keep track of the number of pointers referencing the memory region.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
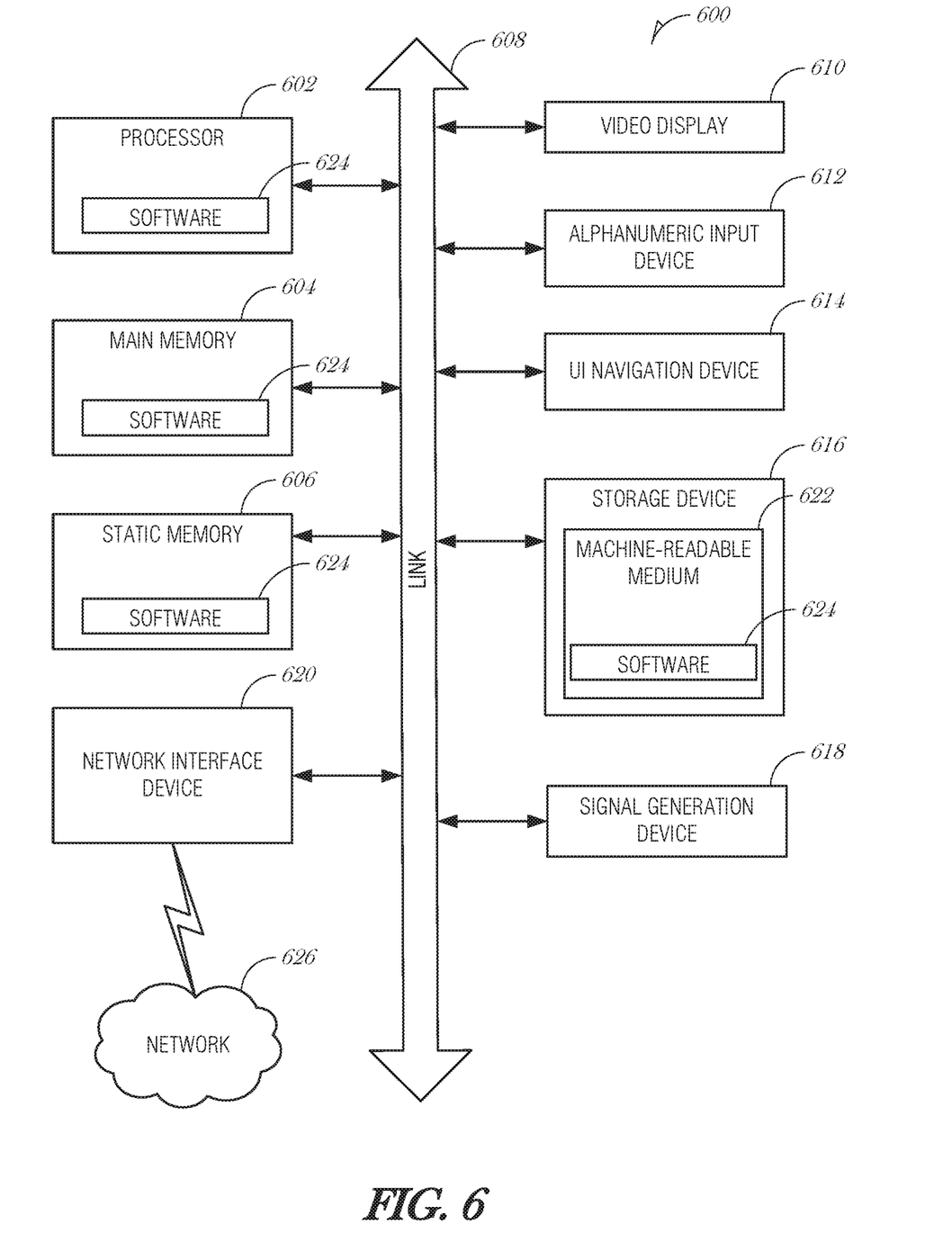
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G. and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for managing memory, the system comprising: a memory management unit to: receive an indication of a memory allocation request; identify a memory region to satisfy the memory allocation request; determine whether the memory region has a tracking record in a tracking data structure, the tracking data structure configured to track whether a particular memory region has any references pointing to it; and revise the tracking record in the tracking data structure when the memory region has the tracking record.

In Example 2, the subject matter of Example 1 includes, wherein to revise the tracking record, the memory management unit is to increment a pointer counter.

In Example 3, the subject matter of Example 2 includes, wherein to revise the tracking record, the memory management unit is to set a valid bit to indicate that the memory region is validly allocated.

In Example 4, the subject matter of Example 3 includes, wherein to set the valid bit to indicate that the memory region is validly allocated, the memory management unit is to set the valid bit to one.

In Example 5, the subject matter of Examples 1-4 includes, wherein the memory management unit is to create a new tracking record in the tracking data structure when the memory region does not have a corresponding tracking record.

In Example 6, the subject matter of Example 5 includes, wherein to create the new tracking record, the memory management unit is to set a pointer counter to one.

In Example 7, the subject matter of Example 6 includes, wherein to create the new tracking record, the memory management unit is to set a valid bit to indicate that the memory region is validly allocated.

In Example 8, the subject matter of Example 7 includes, wherein to set the valid bit to indicate that the memory region is validly allocated, the memory management unit is to set the valid bit to one.

In Example 9, the subject matter of Examples 1-8 includes, wherein the memory management unit is to: receive an operation to free the memory region; decrement the pointer counter; and set the valid bit to indicate that the memory region is not validly allocated.

In Example 10, the subject matter of Example 9 includes, wherein to set the valid bit to indicate that the memory region is validly allocated, the memory management unit is to set the valid bit to zero.

In Example 11, the subject matter of Examples 1-10 includes, wherein the memory management unit is to: receive an indication that a new reference to the memory region has been created; and increment the pointer counter in the tracking record for the memory region.

Example 12 is a method of managing memory, the method comprising: receiving an indication of a memory allocation request; identifying a memory region to satisfy the memory allocation request; determining whether the memory region has a tracking record in a tracking data structure, the tracking data structure configured to track whether a particular memory region has any references pointing to it; and revising the tracking record in the tracking data structure in response to the memory allocation request, when the memory region has the tracking record.

In Example 13, the subject matter of Example 12 includes, wherein revising the tracking record comprises incrementing a pointer counter.

In Example 14, the subject matter of Example 13 includes, wherein revising the tracking record comprises setting a valid bit to indicate that the memory region is validly allocated.

In Example 15, the subject matter of Example 14 includes, wherein setting the valid bit to indicate that the memory region is validly allocated comprises setting the valid bit to one.

In Example 16, the subject matter of Examples 12-15 includes, creating a new tracking record in the tracking data structure when the memory region does not have a corresponding tracking record.

In Example 17, the subject matter of Example 16 includes, wherein creating the new tracking record comprises setting a pointer counter to one.

In Example 18, the subject matter of Example 17 includes, wherein creating the new tracking record comprises setting a valid bit to indicate that the memory region is validly allocated.

In Example 19, the subject matter of Example 18 includes, wherein setting the valid bit to indicate that the memory region is validly allocated comprises setting the valid bit to one.

In Example 20, the subject matter of Examples 12-19 includes, receiving an operation to free the memory region; decrementing the pointer counter; and setting the valid bit to indicate that the memory region is not validly allocated.

In Example 21, the subject matter of Example 20 includes, wherein setting the valid bit to indicate that the memory region is validly allocated comprises setting the valid bit to zero.

In Example 22, the subject matter of Examples 12-21 includes, receiving an indication that a new reference to the memory region has been created; and incrementing the pointer counter in the tracking record for the memory region.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is an apparatus for managing memory, the apparatus comprising: means for receiving an indication of a memory allocation request; means for identifying a memory region to satisfy the memory allocation request; means for determining whether the memory region has a tracking record in a tracking data structure, the tracking data structure configured to track whether a particular memory region has any references pointing to it; and means for revising the tracking record in the tracking data structure in response to the memory allocation request, when the memory region has the tracking record.

In Example 26, the subject matter of Example 25 includes, wherein the means for revising the tracking record comprise means for incrementing a pointer counter.

In Example 27, the subject matter of Example 26 includes, wherein the means for revising the tracking record comprise means for setting a valid bit to indicate that the memory region is validly allocated.

In Example 28, the subject matter of Example 27 includes, wherein the means for setting the valid bit to indicate that the memory region is validly allocated comprise means for setting the valid bit to one.

In Example 29, the subject matter of Examples 25-28 includes, means for creating a new tracking record in the tracking data structure when the memory region does not have a corresponding tracking record.

In Example 30, the subject matter of Example 29 includes, wherein the means for creating the new tracking record comprise means for setting a pointer counter to one.

In Example 31, the subject matter of Example 30 includes, wherein the means for creating the new tracking record comprise means for setting a valid bit to indicate that the memory region is validly allocated.

In Example 32, the subject matter of Example 31 includes, wherein the means for setting the valid bit to indicate that the memory region is validly allocated comprise means for setting the valid bit to one.

In Example 33, the subject matter of Examples 25-32 includes, means for receiving an operation to free the memory region; means for decrementing the pointer counter; and means for setting the valid bit to indicate that the memory region is not validly allocated.

In Example 34, the subject matter of Example 33 includes, wherein the means for setting the valid bit to indicate that the memory region is validly allocated comprise means for setting the valid bit to zero.

In Example 35, the subject matter of Examples 25-34 includes, means for receiving an indication that a new reference to the memory region has been created; and means for incrementing the pointer counter in the tracking record for the memory region.

Example 36 is at least one machine-readable medium including instructions for managing memory, the instructions when executed by a machine, cause the machine to perform operations comprising: receiving an indication of a memory allocation request; identifying a memory region to satisfy the memory allocation request; determining whether the memory region has a tracking record in a tracking data structure, the tracking data structure configured to track whether a particular memory region has any references pointing to it; and revising the tracking record in the tracking data structure in response to the memory allocation request, when the memory region has the tracking record.

In Example 37, the subject matter of Example 36 includes, wherein revising the tracking record comprises incrementing a pointer counter.

In Example 38, the subject matter of Example 37 includes, wherein revising the tracking record comprises setting a valid bit to indicate that the memory region is validly allocated.

In Example 39, the subject matter of Example 38 includes, wherein setting the valid bit to indicate that the memory region is validly allocated comprises setting the valid bit to one.

In Example 40, the subject matter of Examples 36-39 includes, creating a new tracking record in the tracking data structure when the memory region does not have a corresponding tracking record.

In Example 41, the subject matter of Example 40 includes, wherein creating the new tracking record comprises setting a pointer counter to one.

In Example 42, the subject matter of Example 41 includes, wherein creating the new tracking record comprises setting a valid bit to indicate that the memory region is validly allocated.

In Example 43, the subject matter of Example 42 includes, wherein setting the valid bit to indicate that the memory region is validly allocated comprises setting the valid bit to one.

In Example 44, the subject matter of Examples 36-43 includes, receiving an operation to free the memory region; decrementing the pointer counter; and setting the valid bit to indicate that the memory region is not validly allocated.

In Example 45, the subject matter of Example 44 includes, wherein setting the valid bit to indicate that the memory region is validly allocated comprises setting the valid bit to zero.

In Example 46, the subject matter of Examples 36-45 includes, receiving an indication that a new reference to the memory region has been created; and incrementing the pointer counter in the tracking record for the memory region.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second." and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing memory, the system comprising:
   a memory management unit to:
      receive an indication of a memory allocation request;
      identify a memory region to satisfy the memory allocation request;
      determine whether the memory region has a tracking record in a tracking data structure, the tracking data structure configured to track whether a particular memory region has any references pointing to it;
      revise the tracking record in the tracking data structure when the memory region has the tracking record, wherein to revise the tracking record, the memory management unit is to increment a pointer counter, the pointer counter representing a number of pointers used to reference the memory region;
      receive a memory deallocation request to free the memory region;
      in response to the deallocation request, decrement the pointer counter;
      determine whether the pointer counter equals zero; and
      in response to the pointer counter being equal to zero, set a valid bit to indicate that the memory region is not validly allocated.

2. The system of claim 1, wherein to revise the tracking record, the memory management unit is to set the valid bit to indicate that the memory region is validly allocated.

3. The system of claim 2, wherein to set the valid bit to indicate that the memory region is validly allocated, the memory management unit is to set the valid bit to one.

4. The system of claim 1, wherein the memory management unit is to create a new tracking record in the tracking data structure when the memory region does not have a corresponding tracking record.

5. The system of claim 4, wherein to create the new tracking record, the memory management unit is to set the pointer counter to one.

6. The system of claim 5, wherein to create the new tracking record, the memory management unit is to set the valid bit to indicate that the memory region is validly allocated.

7. The system of claim 6, wherein to set the valid bit to indicate that the memory region is validly allocated, the memory management unit is to set the valid bit to one.

8. The system of claim 1, wherein to set the valid bit to indicate that the memory region is not validly allocated, the memory management unit is to set the valid bit to zero.

9. The system of claim 1, wherein the memory management unit is to:
   receive an indication that a new reference to the memory region has been created; and
   increment the pointer counter in the tracking record for the memory region.

10. A method of managing memory, the method comprising:
    receiving an indication of a memory allocation request;
    identifying a memory region to satisfy the memory allocation request;
    determining whether the memory region has a tracking record in a tracking data structure, the tracking data structure configured to track whether a particular memory region has any references pointing to it;
    revising the tracking record in the tracking data structure in response to the memory allocation request, when the memory region has the tracking record, wherein revising the tracking record comprises incrementing a pointer counter, the pointer counter representing a number of pointers used to reference the memory region;
    receiving a memory deallocation request to free the memory region;
    in response to the memory deallocation request, decrementing the pointer counter;
    determine if the pointer counter is equal to zero; and
    in response to the pointer counter being equal to zero, setting a valid bit to indicate that the memory region is not validly allocated.

11. The method of claim 10, wherein revising the tracking record comprises setting the valid bit to indicate that the memory region is validly allocated.

12. The method of claim 11, wherein setting the valid bit to indicate that the memory, region is validly allocated comprises setting the valid bit to one.

13. The method of claim 10, further comprising creating a new tracking record in the tracking data structure when the memory region does not have a corresponding tracking record.

14. The method of claim 13, wherein creating the new tracking record comprises setting the pointer counter to one.

15. The method of claim 14, wherein creating the new tracking record comprises setting the valid bit to indicate that the memory region is validly allocated.

16. The method of claim 15, wherein setting the valid bit to indicate that the memory region is validly allocated comprises setting the valid bit to one.

17. The method of claim 10, wherein setting the valid bit to indicate that the memory region is not, validly allocated comprises setting the valid bit to zero.

18. The method of claim 10, further comprising:
    receiving an indication that a new reference to the memory region has been created; and
    incrementing the pointer counter in the tracking record for the memory region.

19. At least one non-transitory machine-readable medium including instructions for managing memory, the instructions when executed by a machine, cause the machine to perform operations comprising:
    receiving an indication of a memory allocation request;
    identifying a memory region to satisfy the memory allocation request;
    determining whether the memory region has a tracking record in a tracking data structure, the tracking data structure configured to track whether a particular memory region has any references pointing to it;
    revising the tracking record in the tracking data structure in response to the memory allocation request, when the memory region has the tracking record, wherein revising the tracking record comprises incrementing a pointer counter, the pointer counter representing a number of pointers used to reference the memory region;
    receiving a memory deallocation request, to free the memory region;
    in response to the memory deallocation request, decrementing the pointer counter;
    determine if the pointer counter is equal to zero; and
    in response to the pointer counter being equal to zero, setting a valid bit to indicate that the memory region is not validly allocated.

20. The machine-readable medium of claim 19, wherein revising the tracking record comprises setting the valid bit to indicate that the memory region is validly allocated.

* * * * *

UNITED STATES PATENT AND TRADEMARK OFFICE
CERTIFICATE OF CORRECTION

PATENT NO. : 11,074,200 B2  
APPLICATION NO. : 15/843878  
DATED : July 27, 2021  
INVENTOR(S) : Branco et al.

Page 1 of 1

It is certified that error appears in the above-identified patent and that said Letters Patent is hereby corrected as shown below:

On the Title Page

Item (73), in "Assignee", in Column 1, Line 1, delete "California (CA)" and insert --Santa Clara, CA (US)-- therefor In the Claims In Column 15, Line 50, in Claim 12, delete "memory," and insert --memory-- therefor In Column 16, Line 14, in Claim 17, delete "not," and insert --not-- therefor In Column 16, Line 39, in Claim 19, delete "request," and insert --request-- therefor Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*